S. KRAUZE.
INVERTED BURNER.
APPLICATION FILED OCT. 14, 1910.
1,015,692.
Patented Jan. 23, 1912.
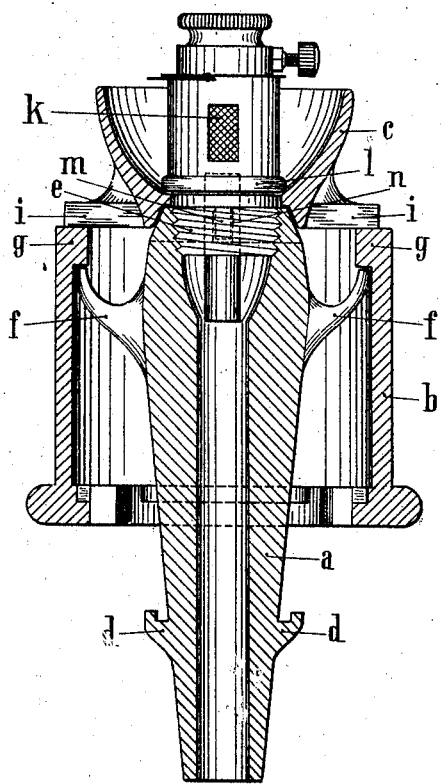
Witnesses:
Inventor:
Stanislaw Krauze
by Edmond Congar Brown
his Attorney.

ж.

UNITED STATES PATENT OFFICE.

STANISLAW KRAUZE, OF WARSAW, RUSSIA.

INVERTED BURNER.

1,015,692.  Specification of Letters Patent.  Patented Jan. 23, 1912.

Application filed October 14, 1910. Serial No. 587,035.

*To all whom it may concern:*

Be it known that I, STANISLAW KRAUZE, a subject of the Czar of Russia, and resident of Warsaw, Russia, have invented a certain new and useful Improvement in Inverted Burners, of which the following is a specification.

The rapidity with which the metal parts of inverted burners contacted by the combustion gases are destroyed has required that such parts as the mixing tube, the casing and the deflector should be formed of refractory material.

The present invention relates to an improved construction of inverted burner in which the difficulties of connecting separate pieces produced from ceramic material in a reliable manner are avoided in this wise, namely, the parts in question, such as the mixing tube, the casing and the deflector, of refractory material, each consist only of a single piece. By simply screwing the nozzle into the mixing tube, all of the parts are simultaneously rigidly connected with one another, the correct adjustment being obtained by suitable formation of the parts.

A feature of this invention is the simple formation of the parts, permitting them to be connected in simple manner. This style of connection may naturally also be used in burners formed from material which is not of refractory nature.

The accompanying drawing shows one form of the invention partly in section and partly in elevation.

The ceramic fitting comprises the inner mixing tube $a$, the casing $b$ and the deflector $c$ crowning the mixing tube.

The lower portion of the mixing tube $a$ is provided with lugs $d$ serving to support the mantle holder. At the upper end the wall of the tube is made of increased section, and is provided on the inner side with a screw thread into which is threaded the nozzle bringing all the parts together. On the outer side of the portion of increased thickness are provided radial arms $f$ which serve to connect the mixing tube $a$ with the casing $b$.
The casing $b$ surrounding the mixing tube is formed at its upper end with a flange $g$ by which it is supported on the arms $f$ of the mixing tube. The lower edge of the casing is also provided with a flange, or is otherwise arranged for attachment of the burner globe.

The mixing tube is advantageously of conical formation at its upper end so as to fit the deflector $c$, the adjacent end of which is correspondingly shaped. The deflector is provided at its lower end with several, for example three, radial projecting parts $i$, which, when the burner is assembled bear on the upper edge $g$ of the casing $b$ and thus maintain the parts in proper relative position. The deflector $c$ is formed at $m$ with a tongue which fits in a corresponding groove $n$ in the mixing tube $a$ and prevents relative rotation of the deflector $c$ and the mixing tube.

The deflector prevents entrance into the regulatable air inlet openings $k$ from below.

On assembling the parts the mixing tube $a$ is first introduced into the casing $b$ so that the arms $f$ bear on the flange $g$. Thereupon the deflector is placed on the mixing tube $a$ in such manner that the arms $i$ rest on the edge of the flange $g$, the tongue $m$ fits into the groove $n$, and the nozzle piece $e$ is then connected with the whole by screwing it into the mixing tube. A flange $l$ on the nozzle then presses on the inner side of the deflector and in consequence clamps together the three ceramic elements $a$, $b$ and $c$ of the fitting.

The heated products of combustion rise inside the globe attached to the casing, between the radial arms formed on the mixing tube, pass out of the casing, come in contact with the deflector, and on account of the inclined surfaces of the latter are guided outward without coming in contact with the metal nozzle piece and the gas supply pipe. This form of deflector also insures the supply of pure air for combustion to the air inlet openings of the nozzle. In the Bunsen tube, which is formed of metal, is inserted a small roll of gauze whereby on the burner being lighted, ignition in the nozzle is prevented.

Having described my invention what I claim and desire to secure by Letters Patent of the United States is:—

1. An inverted burner comprising, in combination with a mixing tube having a threaded socket and a nozzle piece adapted to fit therein, a casing and a deflector, radial arms on said mixing tube, a flange on said casing adapted to be supported by said arms and arms on said deflector adapted to bear on said flange, as and for the purpose set forth.

2. An inverted burner comprising in combination with a mixing tube having a threaded socket and a nozzle piece adapted to fit therein, a casing and a deflector, radial arms on said mixing tube, a flange on said casing adapted to be supported by said arms, arms on said deflector adapted to bear on said flange, a groove in said mixing tube and a tongue on said deflector adapted to enter said groove, as and for the purpose set forth.

3. An inverted burner comprising in combination with a mixing tube having a threaded socket and a nozzle piece adapted to fit therein, a casing and a deflector, radial arms on said mixing tube, a flange on said casing adapted to be supported by said arms, arms on said deflector adapted to bear on said flange, a groove in said mixing tube, a tongue on said deflector adapted to enter said groove, and a flange on said nozzle piece adapted to contact with said deflector, as and for the purpose set forth.

In testimony whereof I have signed my name to this specification in the presence of two subscribing witnesses.

STANISLAW KRAUZE.

Witnesses:
 EDWARD LAKEREMPEN,
 FRANCIS FREMBICK.